UNITED STATES PATENT OFFICE.

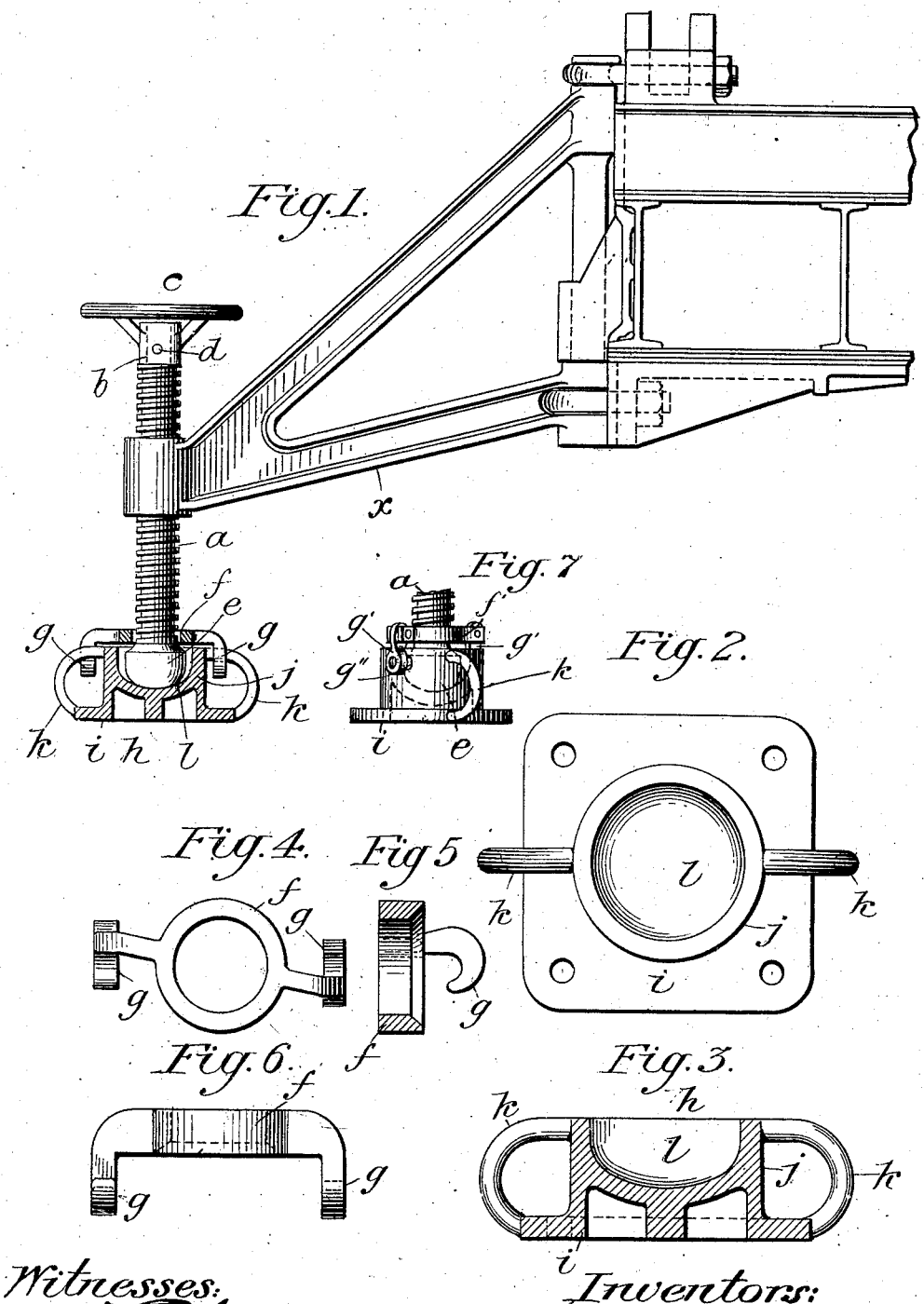

WALTER FERRIS AND SVANTE ROBERT WILLIAM BAGER, OF SOUTH MILWAUKEE, WISCONSIN, ASSIGNORS TO THE BUCYRUS COMPANY, OF SOUTH MILWAUKEE, WISCONSIN, A CORPORATION OF WISCONSIN.

JACK-SCREW.

No. 845,770.  Specification of Letters Patent.  Patented March 5, 1907.

Application filed March 26, 1906. Serial No. 308,126.

*To all whom it may concern:*

Be it known that we, WALTER FERRIS and SVANTE ROBERT WILLIAM BAGER, both citizens of the United States, and both residing at South Milwaukee, county of Milwaukee, State of Wisconsin, have invented certain new and useful Improvements in Jack-Screws; and we do hereby declare the following to be a full, clear, and exact description of the invention, such as will enable others skilled in the art to which it appertains to make and use the same.

This invention relates to certain new and useful improvements in jack-screws, and has for its object to provide a simple and efficient device of this character that will avoid the prevalent difficulty of upsetting at the bearing end under heavy pressure, that will permit the screw-shank to be readily removed from this bearing, and that will enable the bearing-plate to be secured to the shank and carried thereby when the screw is being transported from place to place.

To these ends the invention comprises a threaded shank that is conveniently provided with a reduced neck to receive a handpiece or wheel removably supported thereon, an enlarged foot or bearing at the opposite end, a yoke provided with oppositely-disposed hooks or links and loosely supported on the shank above the foot or bearing, and a bearing-plate coöperating with the enlarged foot or bearing and provided with lateral projections which are adapted to be engaged by the yoke hooks or links when the bearing-plate is to be temporarily secured to the shank.

In the accompanying drawings, Figure 1 represents in side elevation a convenient form of jack-screw, the bearing-plate being shown in cross-section. Fig. 2 is a plan view of the bearing-plate. Fig. 3 is a vertical cross-section thereof. Fig. 4 is a plan view of the yoke. Fig. 5 is a vertical section thereof. Fig. 6 is a side elevation of the yoke. Fig. 7 is a fragmentary elevation of the lower end of a jack-screw, showing a modified from of lifting-yoke.

Referring to the drawings, $a$ indicates the shank, which is provided with screw-threads substantially throughout its length, which are adapted to engage corresponding screw-threads in the socket of the support, which in the form of the invention illustrated is a jack-arm employed in connection with a railway-car. The upper end of the shank $a$ is preferably reduced, as at $b$, to receive a hand-wheel $c$ or other handpiece, which may be removably secured to the shank by means of a pin $d$ or other suitable fastening means.

According to former practice jack-screw shanks have been provided with a screw thread or threads which run out to a small nose or reduced lower end, which permits the shank to be withdrawn from its supporting-socket; but it has been found that this small nose rapidly upsets and enlarges under the heavy pressure imposed upon the shank and not infrequently becomes so large as to prevent the jack-screw being withdrawn through the socket. The present invention obviates this difficulty by so constructing the upper portion of the shank $a$ that upon removing the handpiece $c$ the screw-shank may be withdrawn through the supporting-socket in the reverse direction—that is to say, by turning the shank forward through the nut instead of backing it out.

In order to avoid the tendency of the end of the shank to upset, it is provided with an enlarged foot or bearing $e$, which may be conveniently given a generally round form and which is of considerably larger diameter than the shank.

It is customary to provide devices of this character with a bearing plate or shoe which is interposed between the foot of the shank and the ground or other support. For obvious reasons it is desirable that this bearing plate or shoe be formed as a separate element capable of being removed when the jack-screw is not in use. It is also apparent that it is often convenient to retain the bearing plate or shoe in proper coöperative relation with the shank when the jack-screw is being moved from place to place.

According to former practice it has been customary to make the bearing-plate separate from the shank and to support the same by temporarily attaching it, by means of ropes or chains, to some part of the structure when the latter is to be moved. Such an expedient, however, is generally unsatisfactory and wasteful of time and labor, for the reason that the attachment and detachment of the bearing-plate must be carefully attended to by the workmen.

According to the present invention it is proposed to provide means for automatically picking up the bearing-plate when the jack-screw is retracted and for automatically releasing the bearing-plate when the jack-screw is brought into position for active operation. The automatic engagement and disengagement of the shank and bearing-plate may be effected by any suitable means, and a convenient arrangement for accomplishing this purpose comprises a collar or yoke loosely mounted on the shank and provided with depending links or hooks adapted to engage suitable projections, bails, or the like on the plate.

A convenient form of this mechanism is illustrated in Figs. 1, 4, 5, and 6 of the drawings and comprises a collar or yoke $f$, the central opening of which permits the yoke to be freely moved up and down the shank $a$ and to normally rest upon the upper surface of the enlarged foot or bearing $e$ on the end of the shank. Projecting laterally from opposite sides of the yoke $f$ are two hooks $g$, which are oppositely disposed with respect to each other. These hooks $g$, it will be noted, depend from the sides of the yoke and lie on opposite sides of the shank $a$, so that when the said shank is retracted by the ordinary operation of unscrewing the hooks, which are carried around by frictional engagement between the yoke and the shank, pass under two oppositely-disposed projections on the bearing-plate $h$, which projections may conveniently be formed as bails or handles $k$. It will be noted that when the shank is rotated in the opposite direction—namely, to advance the said shank—the yoke $f$ and the hooks $g$ are rotated in an opposite direction, thereby disengaging the hooks $g$ from the bails $k$ and releasing the bearing-plate $h$ from the shank $a$. It will be apparent also that the bearing plate or shoe $h$ may be manually released at any time by merely turning the yoke on the shank to disengage the hooks from the bails. The said bearing-plate $h$ consists of a generally rectangular base $i$, provided with a boss or protuberance $j$ on its upper face, having therein a socket $l$, provided with a generally rounded bottom to engage the corresponding surface on the end of the foot or bearing $f$ of the shank $a$. The bails or handles $k$ may be conveniently formed as an integral part of the bearing-plate $h$, extending from diametrically opposite points near the top of the boss $j$ to the base $i$. These bails $k$ also afford convenient means for lifting and transporting the bearing-plates by hand or in any other desired manner.

It will be noted that the invention, as hereinbefore described, affords an exceedingly simple and efficient device for the purpose specified and admits of ready adaptation under the varying conditions of operation.

For example, when it is desired to remove the bearing-plate it is released by merely turning the yoke $f$ to disengage the hooks $g$ from the bails $k$. On the other hand, when it is desired to lift the bearing-plate when the apparatus is moved from place to place the mere act of retracting the shank of the jack-screw from its engagement with its ground support automatically causes the hooks on yoke $f$ to engage the bails on the bearing-plate and support said plate from the shank. Furthermore, when it is desired to remove the shank from its bearing socket or support, it is only necessary to lift the handle from its engagement with the upper end of the shank and turn the latter forward until its threads pass out of engagement with the socket.

It will be apparent that the lifting-yoke and the mode of engaging the same with the bearing-plate may be varied within wide limits without departing from the spirit of the invention. One simple and convenient modification of the lifting-yoke and its connecting means is illustrated in Fig. 7, in which the yoke $f'$ is provided with two lateral ears, in which are pivoted pendent links $g'$ $g'$, the eyes of which are adapted to engage pins $g''$ $g''$, projecting from the opposite sides of the bearing-plate. The links being pivoted to the body of the yoke $f'$ may of course be swung into and out of engagement with the pins $g''$ at will, and it will be understood that the holes or eyes in the links are made sufficiently large to pass freely into and out of engagement with said pins. Furthermore, it will be noted that the disposition of the links and pins may be reversed—to wit, the links may be located on the plate and the pins on the yoke—and a similar disposition may be effected with respect to the hooks and coöperating engaging means illustrated in Fig. 1, all of which modifications are regarded as falling within the scope of our present invention.

What we claim is—

1. A jack-screw, comprising a threaded shank, a reduced neck, a handpiece removably mounted on said neck, and an enlarged foot or bearing on the end opposite the handpiece.

2. A jack-screw, comprising a threaded shank, an enlarged foot or bearing on the end thereof, a bearing-plate coöperating with said foot or bearing, and coöperating means on the shank and plate to removably secure said plate to the shank.

3. A jack-screw, comprising a threaded shank, a yoke having oppositely-disposed hooks thereon loosely mounted on said shank, and a bearing-plate having projections thereon to engage the yoke-hooks and support the plate from the shank when the latter is retracted.

4. A jack-screw, comprising a threaded shank, a yoke loosely mounted on said shank and having engaging members thereon, and a bearing-plate having coöperating members thereon to engage the yoke members and support the plate from the shank when the latter is lifted.

5. A jack-screw, comprising a threaded shank, a yoke having oppositely-disposed hooks thereon loosely mounted on said shank, and a bearing-plate having lateral bails or handles to engage the hooks and support the plate from the shank when the latter is retracted.

6. A jack-screw, comprising a threaded shank, an enlarged foot or bearing at one end thereof, a yoke loosely surrounding the shank above said foot and having oppositely-projecting hooks thereon, and a bearing-plate coöperating with said foot or bearing, said plate having lateral bails or handles to engage the hooks and support the plate from the shank when the latter is retracted.

7. A jack-screw, comprising a threaded shank, a handpiece removably secured to one end thereof, an enlarged foot or bearing at the opposite end of said shank, a yoke having oppositely-disposed hooks on said shank above the foot or base, a socketed bearing-plate coöperating with said foot or bearing, and lateral bails or handles on said plate coöperating with the said hooks to support the plate.

In testimony whereof we affix our signatures in presence of two witnesses.

WALTER FERRIS.
SVANTE ROBERT WILLIAM BAGER.

Witnesses:
HARRY B. HAYDEN,
RIDGELY FLETCHER.